US 11,082,702 B2

(12) United States Patent
Park et al.

(10) Patent No.: US 11,082,702 B2
(45) Date of Patent: Aug. 3, 2021

(54) INTER PREDICTION MODE-BASED IMAGE PROCESSING METHOD AND DEVICE THEREFOR

(71) Applicant: LG Electronics Inc., Seoul (KR)

(72) Inventors: Naeri Park, Seoul (KR); Junghak Nam, Seoul (KR); Seunghwan Kim, Seoul (KR); Jungdong Seo, Seoul (KR); Jaeho Lee, Seoul (KR); Hyeongmoon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/628,420

(22) PCT Filed: Mar. 14, 2018

(86) PCT No.: PCT/KR2018/002988
§ 371 (c)(1),
(2) Date: Jan. 3, 2020

(87) PCT Pub. No.: WO2019/009498
PCT Pub. Date: Jan. 10, 2019

(65) Prior Publication Data
US 2020/0162743 A1 May 21, 2020

Related U.S. Application Data

(60) Provisional application No. 62/528,159, filed on Jul. 3, 2017.

(51) Int. Cl.
*H04N 19/00* (2014.01)
*H04N 19/159* (2014.01)
(Continued)

(52) U.S. Cl.
CPC ......... *H04N 19/159* (2014.11); *H04N 19/105* (2014.11); *H04N 19/139* (2014.11); *H04N 19/176* (2014.11); *H04N 19/513* (2014.11)

(58) Field of Classification Search
CPC ..................................................... H04N 19/00
See application file for complete search history.

(56) References Cited

U.S. PATENT DOCUMENTS

| 2015/0271516 A1* | 9/2015 | Arimura | H04N 19/105 |
| | | | 375/240.16 |
| 2019/0174136 A1* | 6/2019 | Jun | H04N 19/593 |
| 2020/0068218 A1* | 2/2020 | Chen | H04N 19/105 |

FOREIGN PATENT DOCUMENTS

| CN | 106165419 A | 11/2016 |
| JP | 2014514861 A | 6/2014 |

(Continued)

OTHER PUBLICATIONS

Chen, Jianle et al. "Algorithm Description of Joint Exploration Test Model 2", Joint Video Exploration Team (JVET) of ITU-T SG 16 WP 3 and ISO/IEC JTC 1/SC 29/WG 11, JVET-B100, 2nd Meeting, San Diego, USA, Feb. 26, 2016.

*Primary Examiner* — Maryam A Nasri
(74) *Attorney, Agent, or Firm* — Dentons US LLP

(57) ABSTRACT

Disclosed herein are an inter prediction mode-based image processing method and an apparatus therefor. Specifically, a method for processing an image based on an inter prediction mode may include: generating a temporary candidate list by using a spatial neighbor block or temporal neighbor block of a current block; calculating a cost for each candidate in the temporary candidate list by using a template of the current block; generating a final candidate list by rearranging candidates of the temporary candidate list based on the calculated cost; decoding a merge index indicating a specific candidate in the final candidate list; and generating a prediction block of the current block by using motion information of a candidate indicated by the merge index.

9 Claims, 22 Drawing Sheets

(51) Int. Cl.
*H04N 19/105* (2014.01)
*H04N 19/139* (2014.01)
*H04N 19/176* (2014.01)
*H04N 19/513* (2014.01)

(56) References Cited

FOREIGN PATENT DOCUMENTS

JP        2016537869 A    12/2016
WO    2017052081 A1    3/2017

* cited by examiner

[FIG. 1]
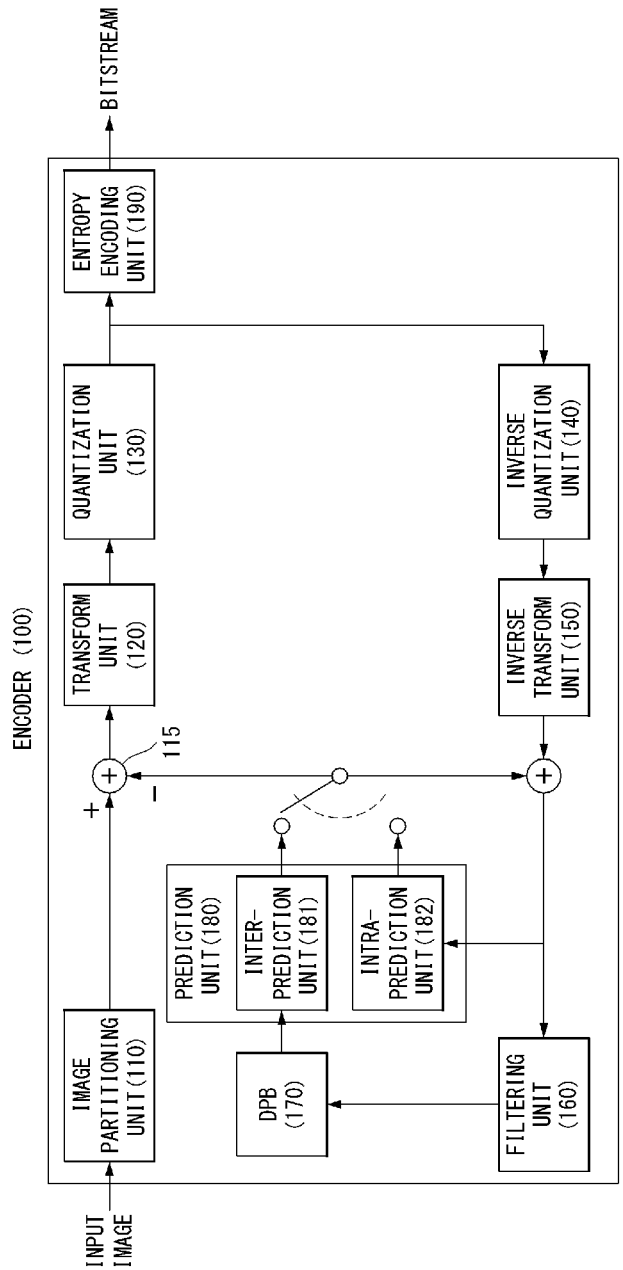

[FIG. 2]
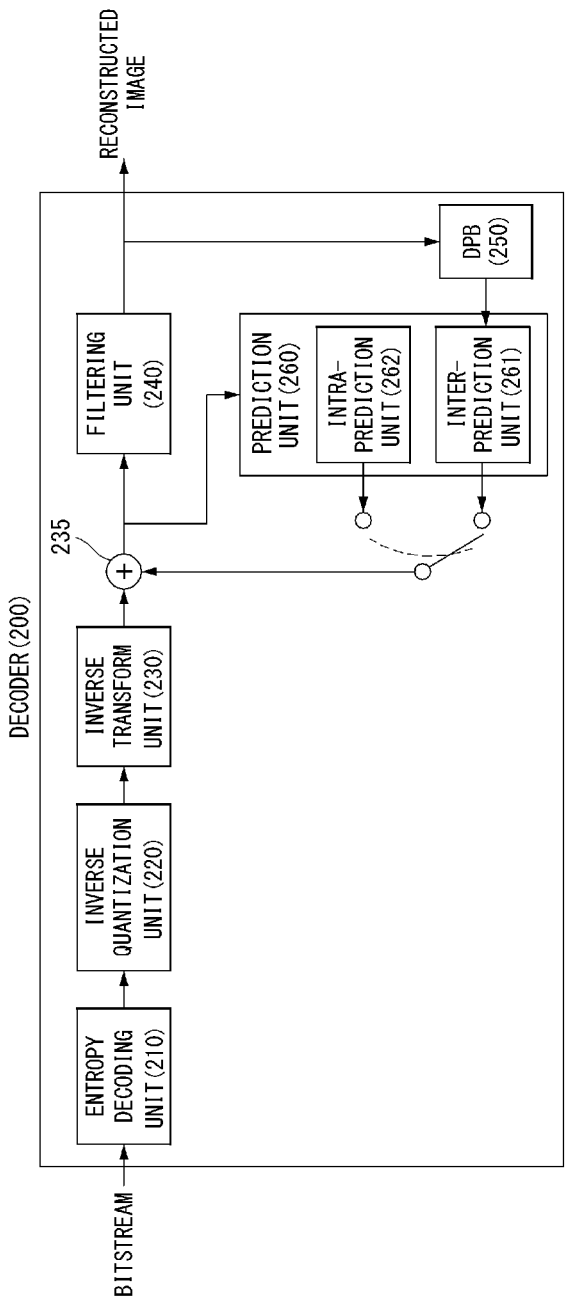

[FIG. 3]
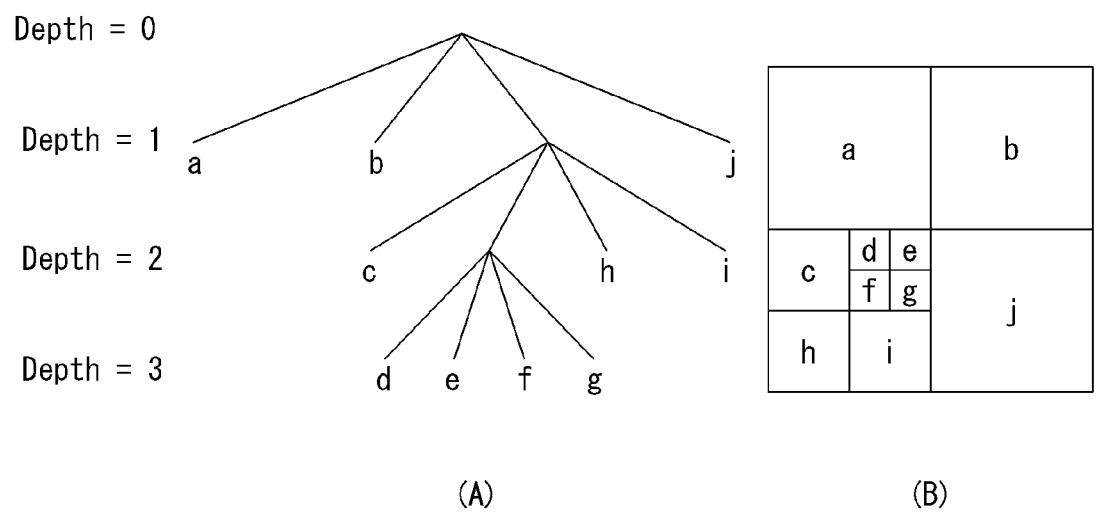

[FIG. 4]
Intra:
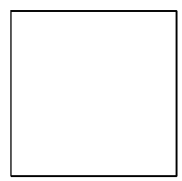
2Nx2N
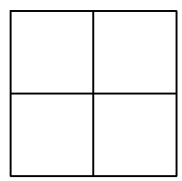
NxN
Inter:
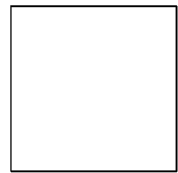
2Nx2N
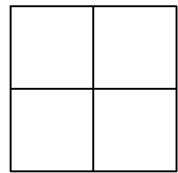
NxN
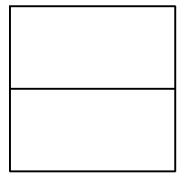
2NxN
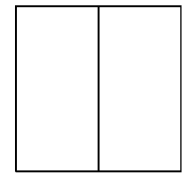
Nx2N
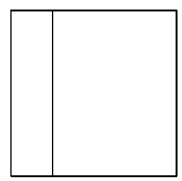
nLx2N
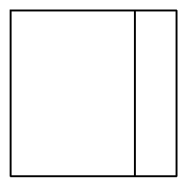
nRx2N
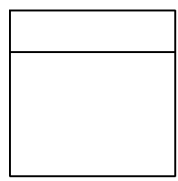
2NxnU
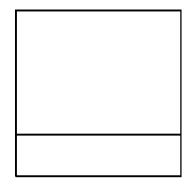
2NxnD

[FIG. 5]
Current picture
(a) 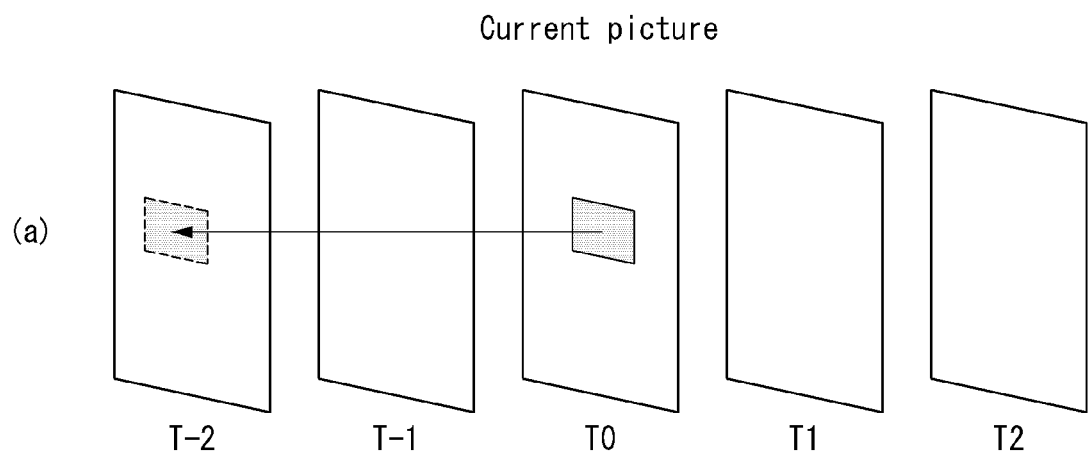
T-2    T-1    T0    T1    T2
Current picture
(b) 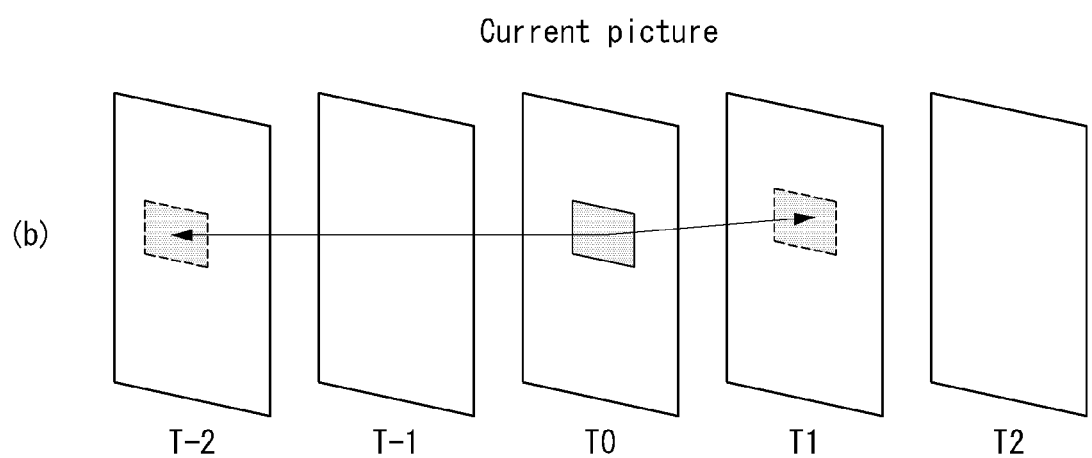
T-2    T-1    T0    T1    T2

[FIG. 6]

| A<br>-1,-1 | | | A<br>0,-1 | a<br>0,-1 | b<br>0,-1 | c<br>0,-1 | A<br>1,-1 | | | A<br>2,-1 |
|---|---|---|---|---|---|---|---|---|---|---|
| | | | | | | | | | | |
| | | | | | | | | | | |
| | | | | | | | | | | |
| A<br>-1,0 | | | A<br>0,0 | a<br>0,0 | b<br>0,0 | c<br>0,0 | A<br>1,0 | | | A<br>2,0 |
| d<br>-1,0 | | | d<br>0,0 | e<br>0,0 | f<br>0,0 | g<br>0,0 | d<br>1,0 | | | d<br>2,0 |
| h<br>-1,0 | | | h<br>0,0 | i<br>0,0 | j<br>0,0 | k<br>0,0 | h<br>1,0 | | | h<br>2,0 |
| n<br>-1,0 | | | n<br>0,0 | p<br>0,0 | q<br>0,0 | r<br>0,0 | n<br>1,0 | | | n<br>2,0 |
| A<br>-1,1 | | | A<br>0,1 | a<br>0,1 | b<br>0,1 | c<br>0,1 | A<br>1,1 | | | A<br>2,1 |
| | | | | | | | | | | |
| | | | | | | | | | | |
| | | | | | | | | | | |
| A<br>-1,2 | | | A<br>0,2 | a<br>0,2 | b<br>0,2 | c<br>0,2 | A<br>1,2 | | | A<br>2,2 |

[FIG. 7]
(a) 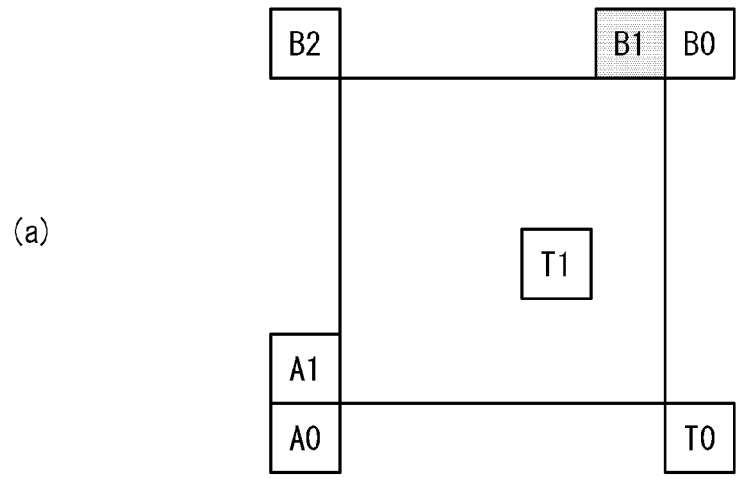
(b) 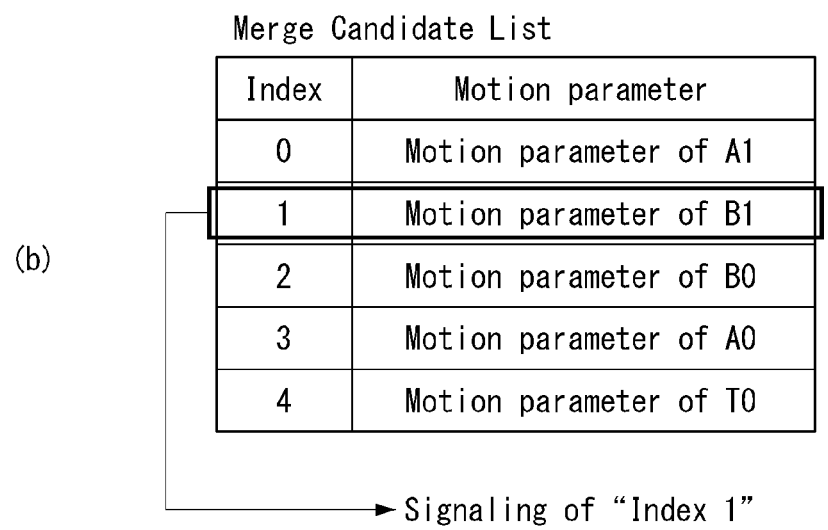

[FIG. 8]
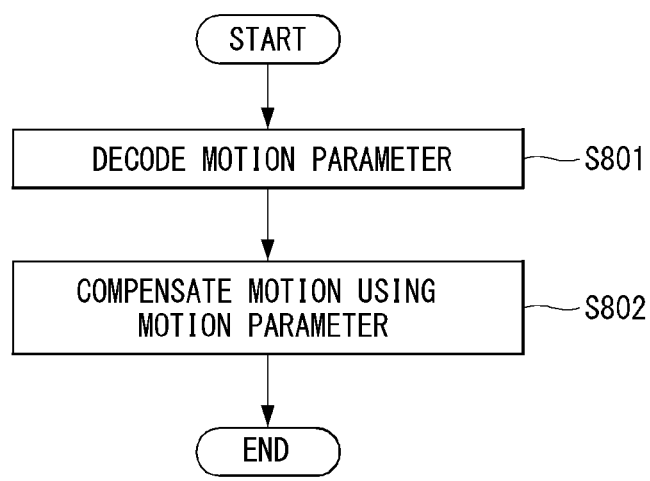

[FIG. 9]
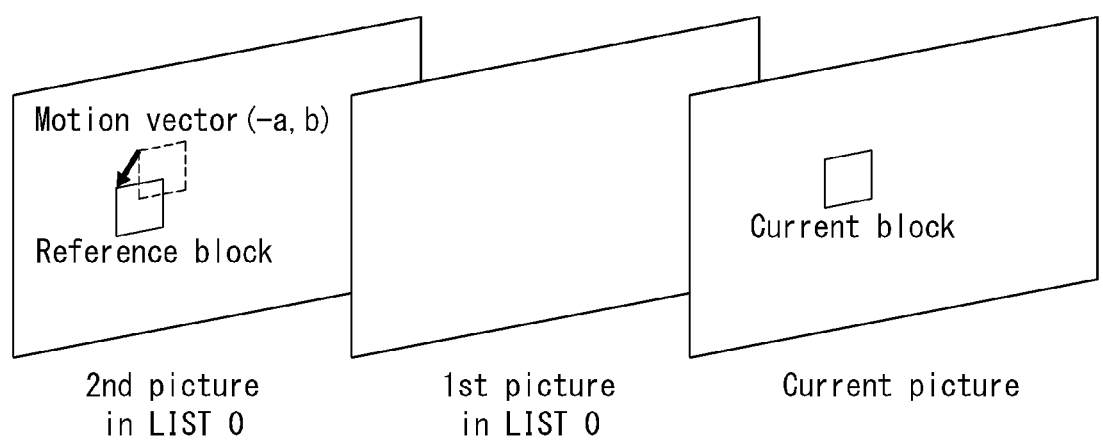

[FIG. 10]
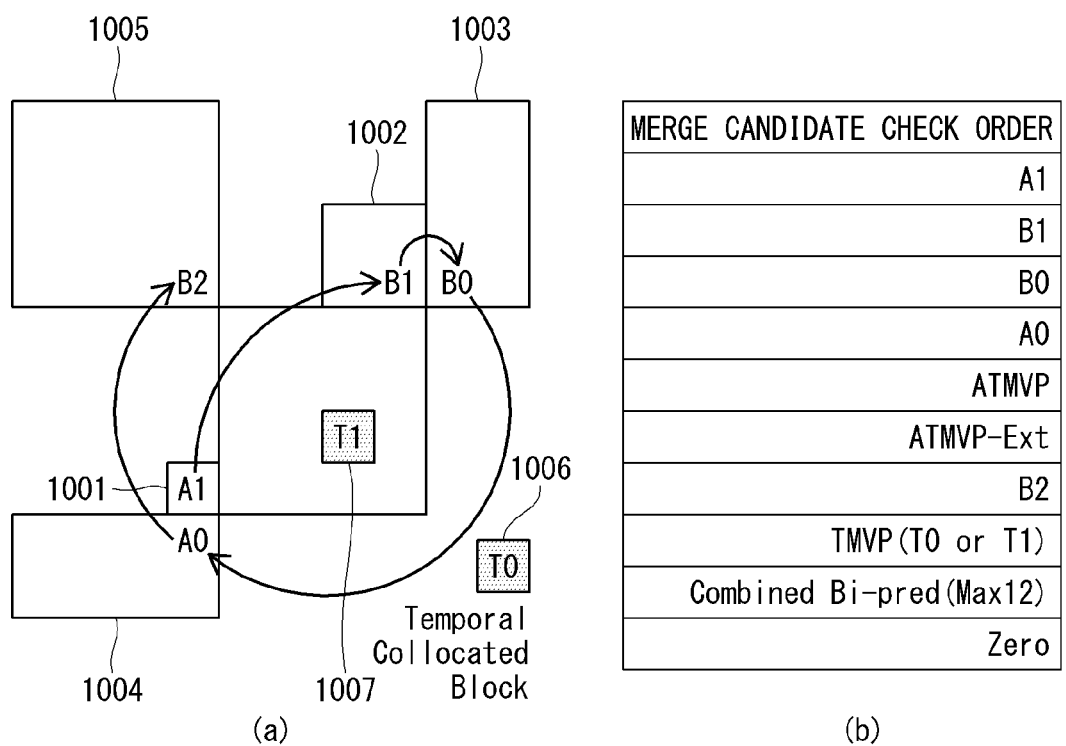

[FIG. 11]
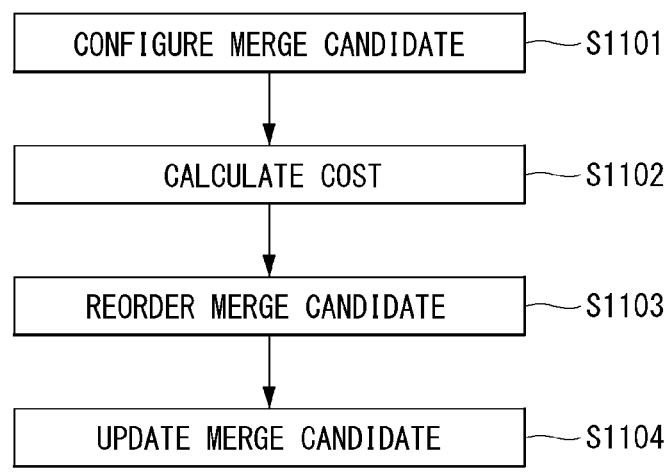

[FIG. 12]
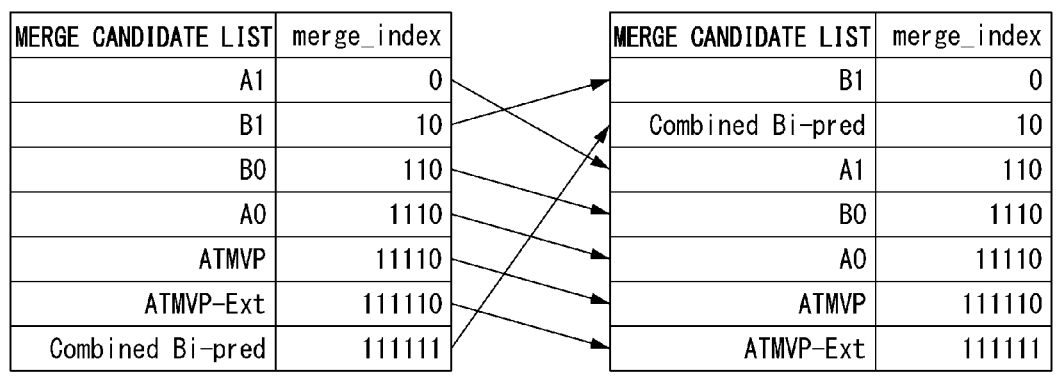
MERGE CANDIDATE CONSTRUCTION ➡ COST BASED REORDERING ➡ MERGE CANDIDATE UPDATE

[FIG. 13]
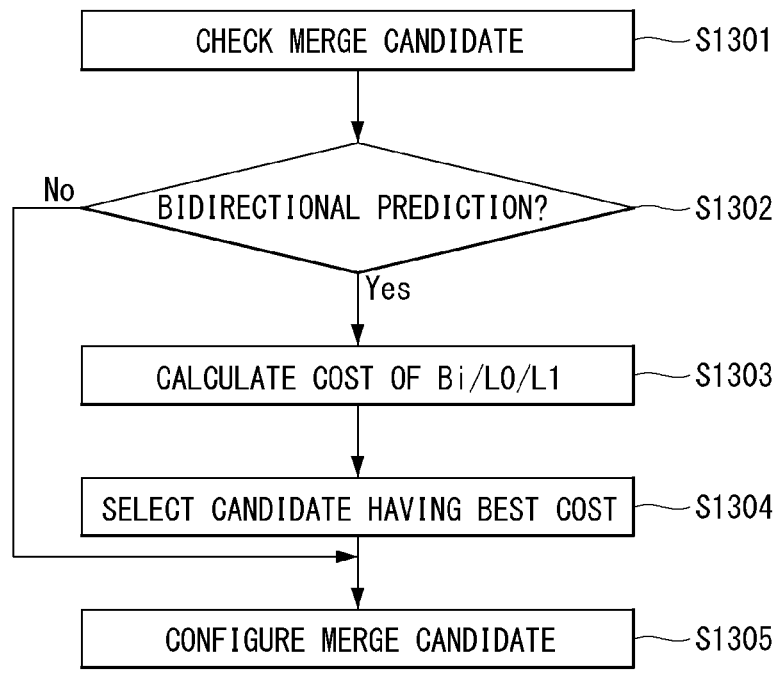

[FIG. 14]
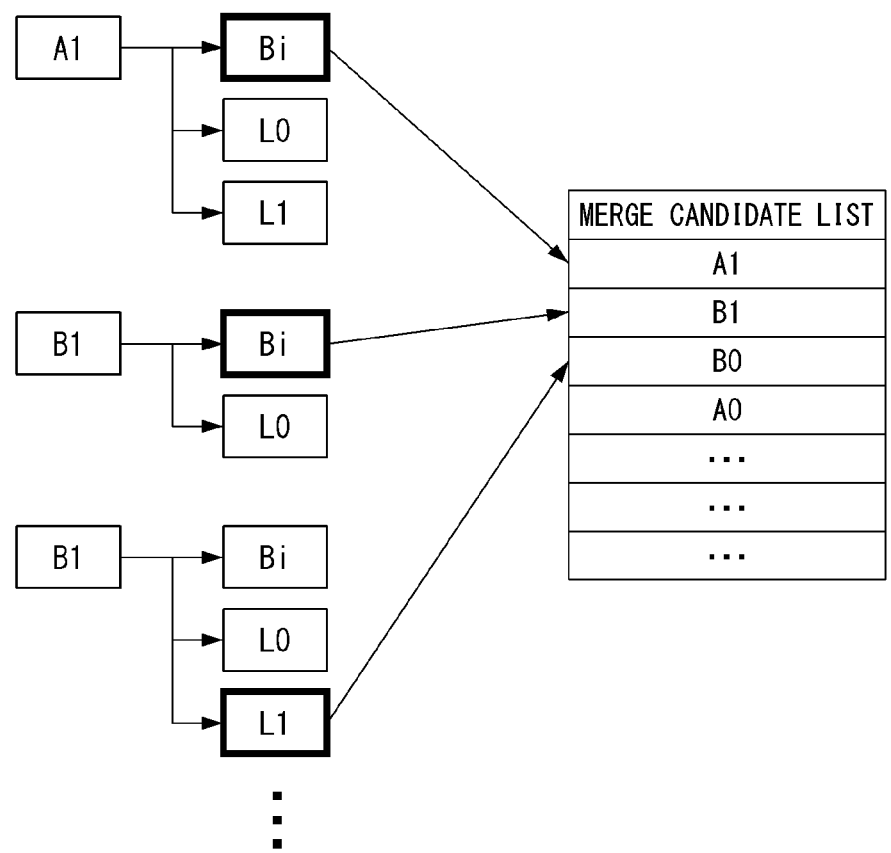

[FIG. 15]
(a)
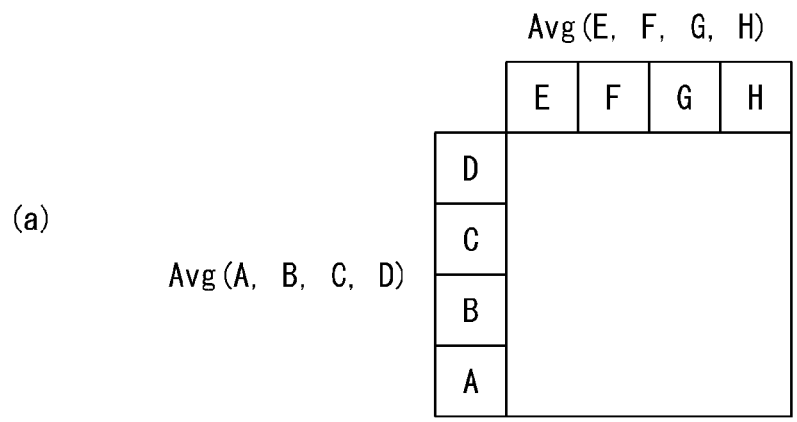
(b)
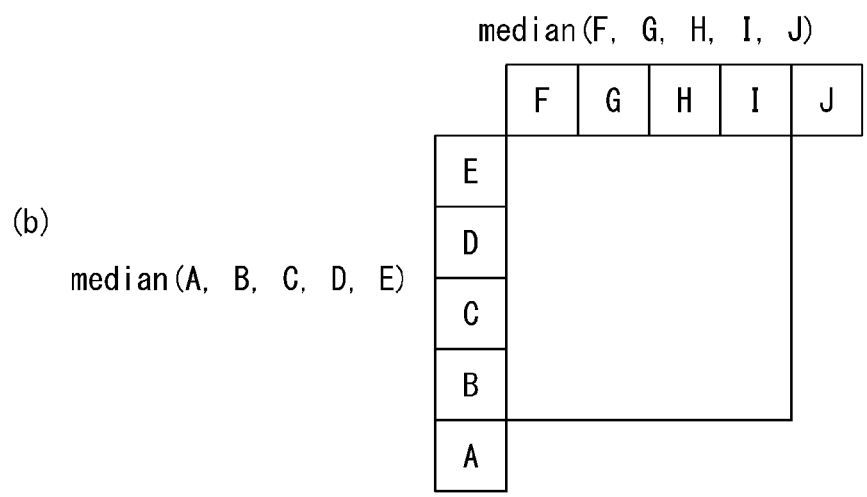

[FIG. 16]
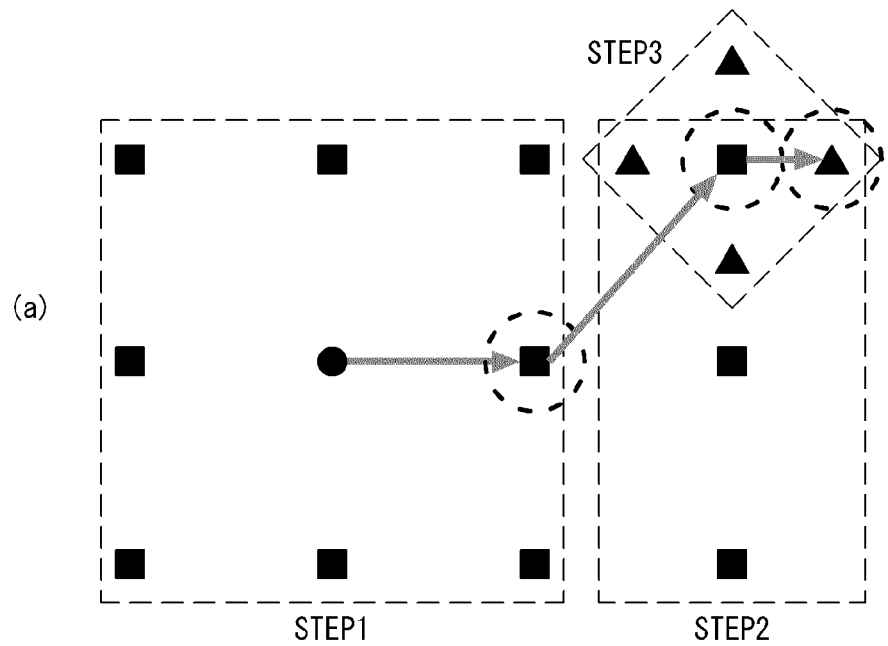
(a)
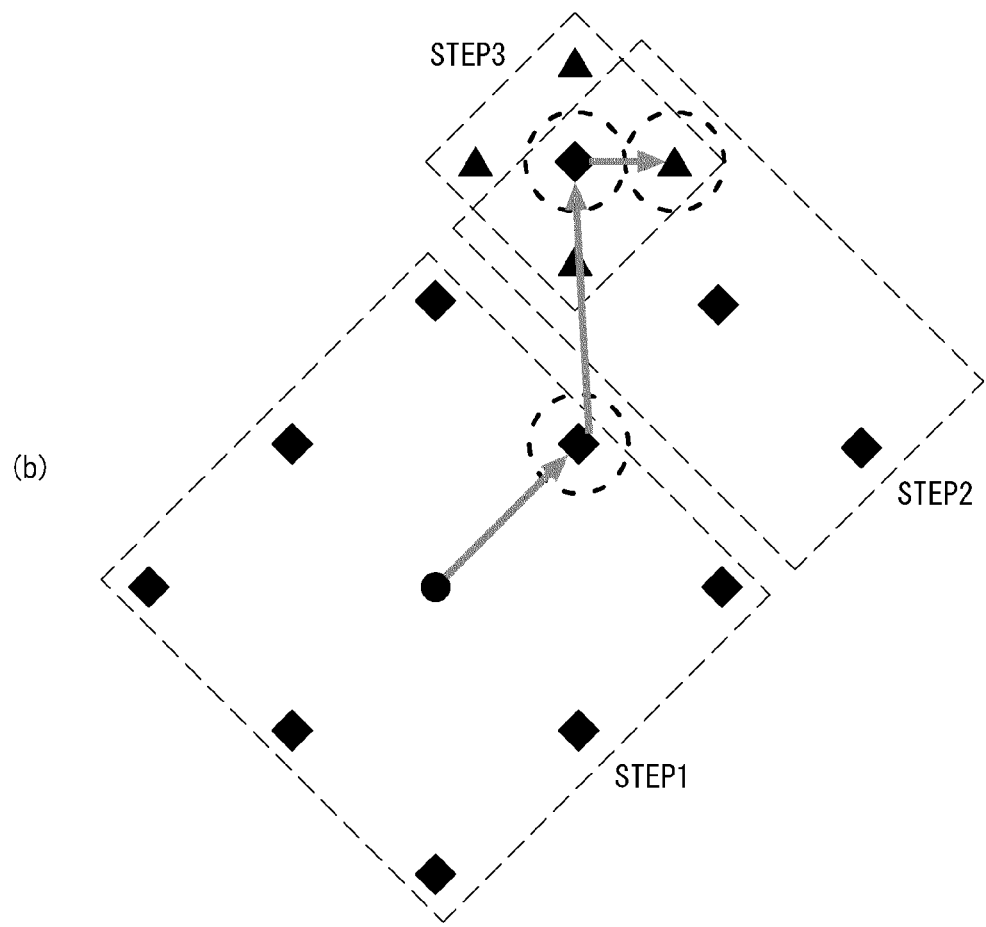
(b)

[FIG. 17]
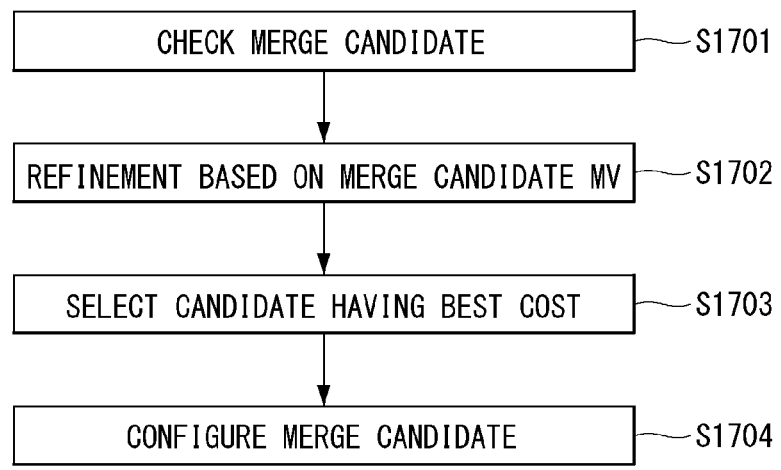

[FIG. 18]
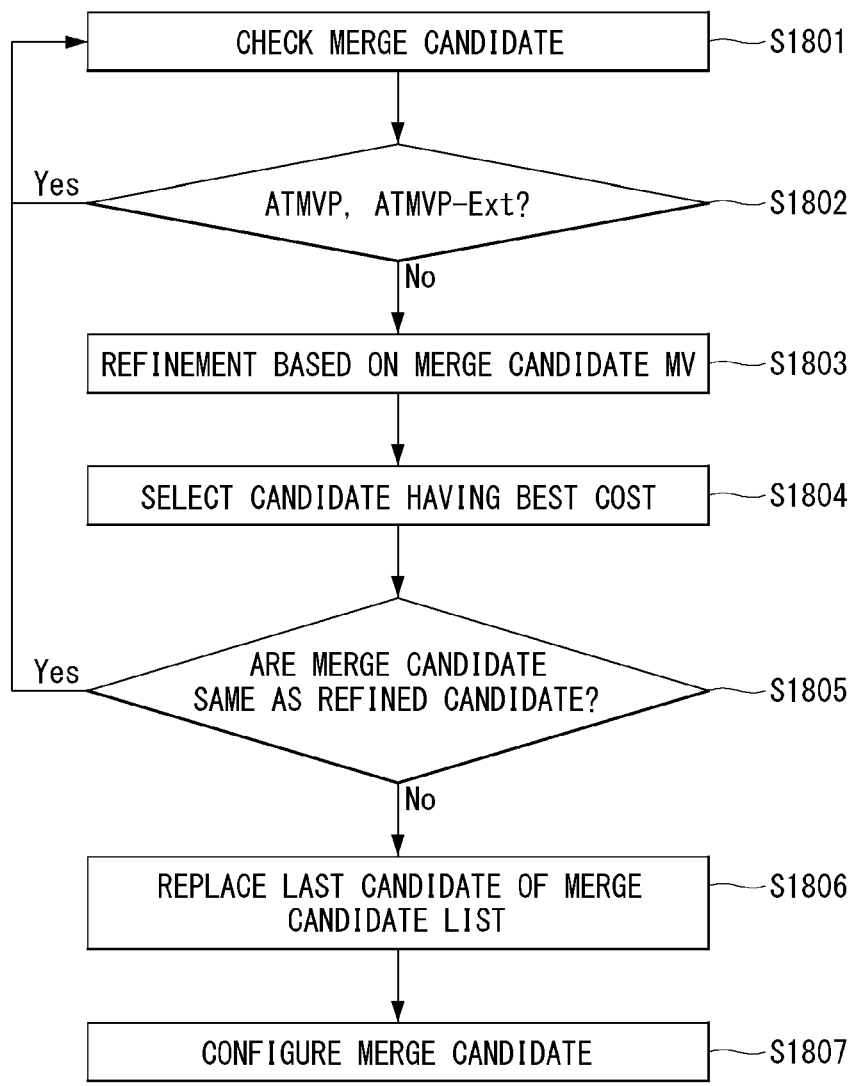

[FIG. 19]
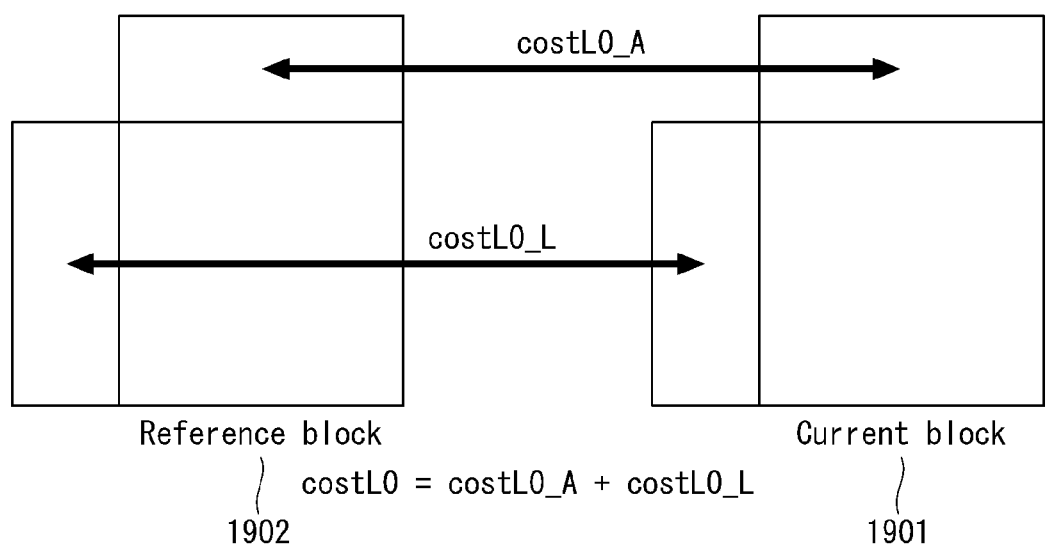

[FIG. 20]
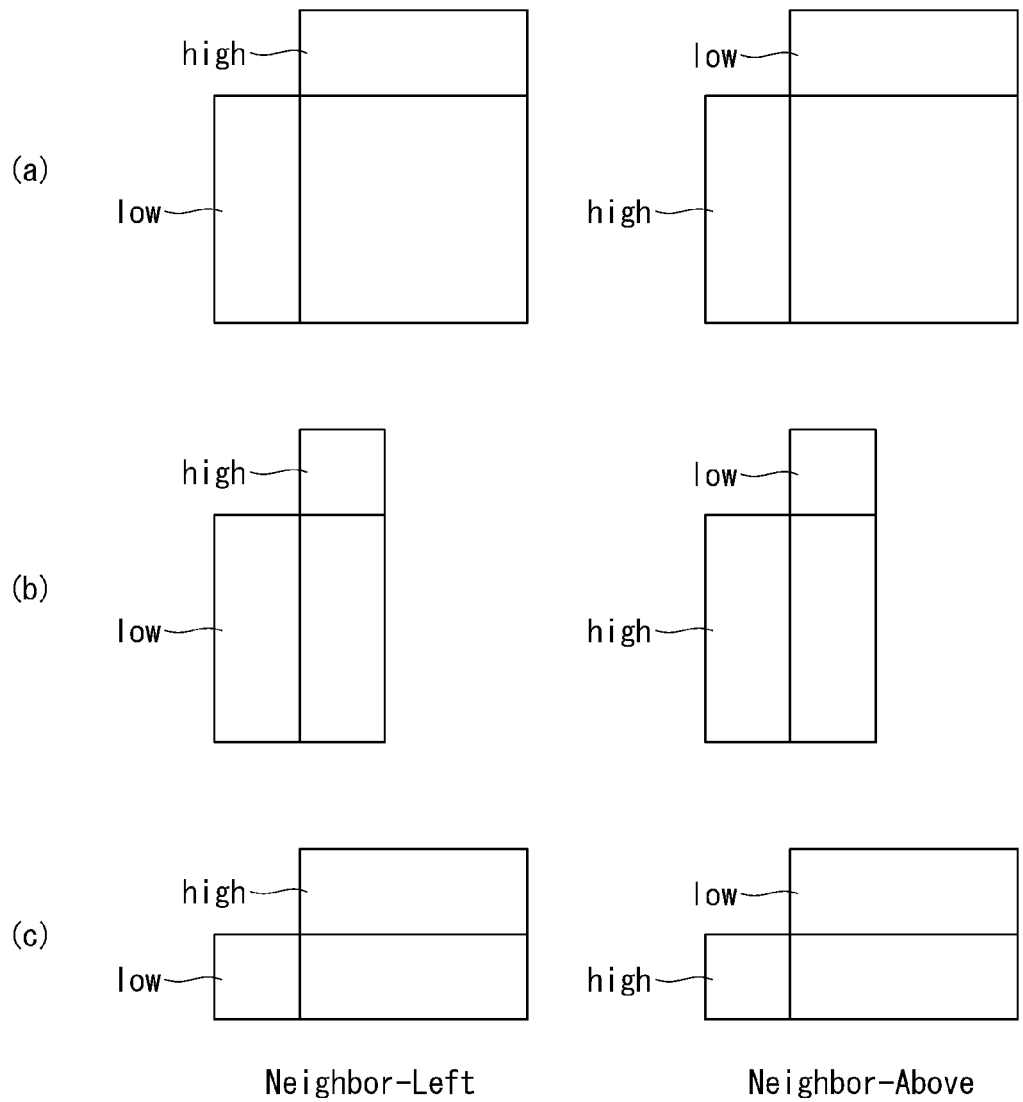

[FIG. 21]
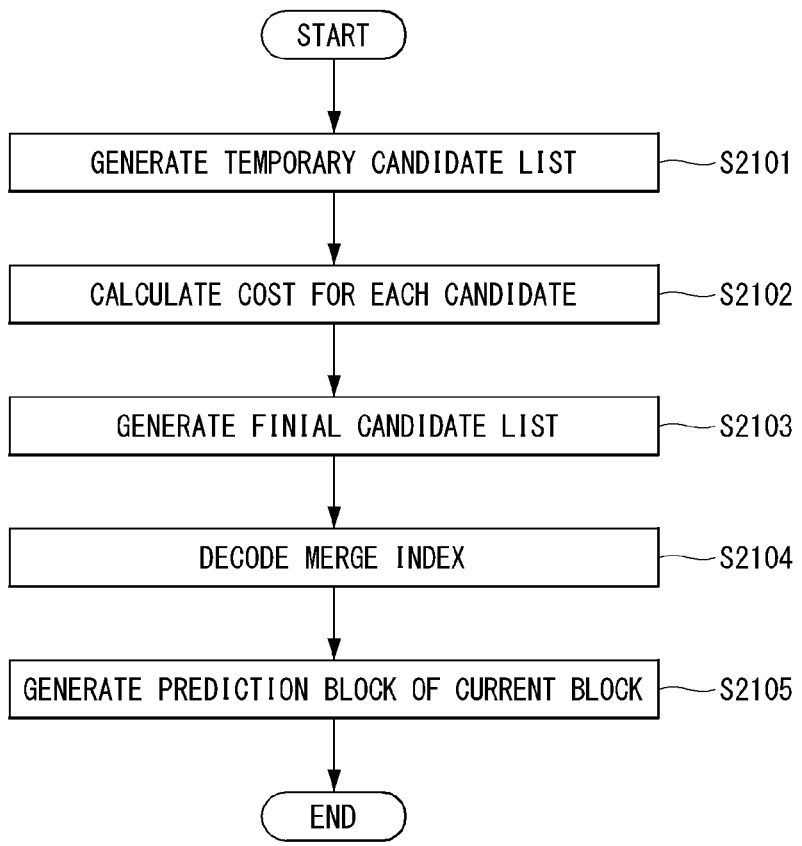

[FIG. 22]
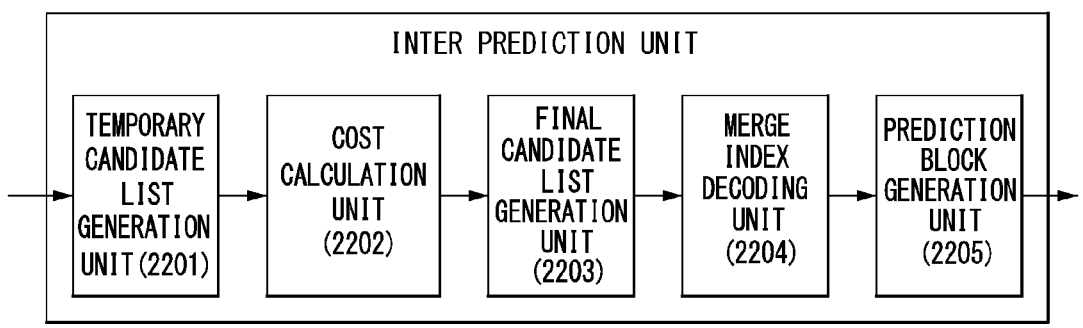

INTER PREDICTION MODE-BASED IMAGE PROCESSING METHOD AND DEVICE THEREFOR

CROSS-REFERENCE TO RELATED APPLICATIONS

The present application is the National Stage filing under 35 U.S.C. 371 of International Application No. PCT/KR2018/002988, filed on Mar. 14, 2018, which claims the benefit of U.S. Provisional Application No. 62/528,159 filed on Jul. 3, 2017, the contents of which are all hereby incorporated by reference herein in their entirety.

TECHNICAL FIELD

The present disclosure relates to a method of processing a still image or a moving image and, more particularly, to a method of encoding/decoding a still image or a moving image based on an inter-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

An embodiment of the present disclosure proposes a method for efficiently configuring a candidate list (i.e., merge candidate list) for a merge mode in performing inter prediction.

Furthermore, an embodiment of the present disclosure proposes a method for reordering candidates of a merge candidate list based on the similarity of template regions.

Furthermore, an embodiment of the present disclosure proposes a method for calculating cost of a merge candidate by using a template.

Further, an embodiment of the present disclosure proposes a method for refining a motion vector of a merge candidate in units of integer pixels or fractional pixels.

Technical objects to be achieved in the present disclosure are not limited to the aforementioned technical objects, and other technical objects not described above may be evidently understood by a person having ordinary skill in the art to which the present disclosure pertains from the following description.

Technical Solution

In an aspect of the present disclosure, a method for processing an image based on an inter prediction may include: generating a temporary candidate list by using a spatial neighbor block or temporal neighbor block of a current block; calculating a cost for each candidate in the temporary candidate list by using a template of the current block; generating a final candidate list by rearranging candidates of the temporary candidate list based on the calculated cost; decoding a merge index indicating a specific candidate in the final candidate list; and generating a prediction block of the current block by using motion information of a candidate indicated by the merge index.

Preferably, the merge index may indicate one of predetermined number of candidates according to a high order of in the final candidate list.

Preferably, generating the temporary candidate list may include: identifying a candidate having a bi-direction motion information among candidates of the temporary candidate list; and adding uni-direction motion information of L0 direction or L1 direction to the temporary candidate list, among motion information having the bi-direction motion information.

Preferably, generating the temporary candidate list may include adding an average value or a median value of motion information of blocks having a predetermined size neighboring to a left side or an upper side of the current block to the temporary candidate list.

Preferably, adding the average value or the median value to the temporary candidate list may include scaling a motion vector of the blocks having the predetermined size according to a distance to a reference picture.

Preferably, the method may further include refining a motion vector of candidates in the final candidate list in an integer pixel unit or a fractional pixel unit.

Preferably, refining the motion vector may include calculating a cost of a motion vector indicating a neighboring integer pixel or a neighboring fractional pixel which is adjacent to a pixel indicated by the motion vector.

Preferably, the cost of the motion vector indicating the neighboring integer pixel or the neighboring fractional pixel may be calculated based on a difference between the template of the current block and a template of a reference block identified by the motion vector indicating the neighboring integer pixel or the neighboring fractional pixel.

Preferably, the cost for each candidate may be calculated based on a difference between the template of the current block and a template of a reference block of a motion vector of the candidate.

Preferably, if the current block is a non-square block, a normalization may be performed on the difference based on a width and a height of the current block.

In another aspect of the present disclosure, an apparatus for processing an image based on an inter prediction may include: a temporary candidate list generation unit for generating a temporary candidate list by using a spatial neighbor block or temporal neighbor block of a current block; a cost calculation unit for calculating a cost for each candidate in the temporary candidate list by using a template of the current block; a final candidate list generation unit for generating a final candidate list by rearranging candidates of the temporary candidate list based on the calculated cost; a merge index decoding unit for decoding a merge index indicating a specific candidate in the final candidate list; and a prediction block generation unit for generating a prediction block of the current block by using motion information of a candidate indicated by the merge index.

Advantageous Effects

According to an embodiment of the present disclosure, a merge candidate list is generated by considering more candidates than the existing merge mode to increase accuracy of prediction and enhance encoding efficiency.

Further, according to an embodiment of the present disclosure, motion information can be signaled with a small number of bits by using a rearranged merge candidate list, thereby enhancing compression performance.

Further, according to an embodiment of the present disclosure, a motion vector of a merge candidate is refined in units of integer pixels or fractional pixels to increase accuracy of motion information prediction.

Technical effects which may be obtained in the present disclosure are not limited to the technical effects described above, and other technical effects not mentioned herein may be understood to those skilled in the art from the description below.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 1 illustrates a schematic block diagram of an encoder in which the encoding of a still image or video signal is performed, as an embodiment to which the present disclosure is applied.

FIG. 2 illustrates a schematic block diagram of a decoder in which decoding of a still image or video signal is performed, as an embodiment to which the present disclosure is applied.

FIG. 3 is a diagram for describing a split structure of a coding unit that may be applied to the present disclosure.

FIG. 4 is a diagram for describing a prediction unit that may be applied to the present disclosure.

FIG. 5 is an embodiment to which the present disclosure may be applied and is a diagram illustrating the direction of inter-prediction.

FIG. 6 is an embodiment to which the present disclosure may be applied and illustrates integers for ¼ sample interpolation and a fraction sample location.

FIG. 7 is an embodiment to which the present disclosure may be applied and illustrates the location of a spatial candidate.

FIG. 8 is an embodiment to which the present disclosure is applied and is a diagram illustrating an inter-prediction method.

FIG. 9 is an embodiment to which the present disclosure may be applied and is a diagram illustrating a motion compensation process.

FIG. 10 is a diagram for describing a method for generating a merge candidate list by using a spatial neighbor block or a temporal neighbor block as an embodiment to which the present disclosure is applied.

FIG. 11 is a flowchart showing a method for reordering a merge candidate list based on cost as an embodiment to which the present disclosure is applied.

FIG. 12 is a diagram illustrating a method for reordering a merge candidate list based on cost as an embodiment to which the present disclosure is applied.

FIGS. 13 and 14 are flowcharts showing a method for configuring a merge candidate as an embodiment to which the present disclosure is applied.

FIG. 15 is a diagram illustrating a method for generating a merge candidate by using neighbor blocks as an embodiment to which the present disclosure is applied.

FIG. 16 is a diagram for describing a method for refining a motion vector of a merge candidate as an embodiment to which the present disclosure is applied.

FIG. 17 is a flowchart showing a method for refining a motion vector of a merge candidate as an embodiment to which the present disclosure is applied.

FIG. 18 is a flowchart showing a method for refining a motion vector of a merge candidate as an embodiment to which the present disclosure is applied.

FIG. 19 is a diagram for describing a method for calculating cost based on a template as an embodiment to which the present disclosure is applied.

FIG. 20 is a diagram for describing a method for calculating cost based on a template as an embodiment to which the present disclosure is applied.

FIG. 21 is a diagram illustrating an inter prediction method according to an embodiment of the present disclosure.

FIG. 22 is a diagram more specifically illustrating an intra predictor according to an embodiment of the present disclosure.

MODE FOR INVENTION

Hereinafter, a preferred embodiment of the present disclosure will be described by reference to the accompanying drawings. The description that will be described below with the accompanying drawings is to describe exemplary embodiments of the present disclosure, and is not intended to describe the only embodiment in which the present disclosure may be implemented. The description below includes particular details in order to provide perfect understanding of the present disclosure. However, it is understood that the present disclosure may be embodied without the particular details to those skilled in the art.

In some cases, in order to prevent the technical concept of the present disclosure from being unclear, structures or devices which are publicly known may be omitted, or may be depicted as a block diagram centering on the core functions of the structures or the devices.

Further, although general terms widely used currently are selected as the terms in the present disclosure as much as possible, a term that is arbitrarily selected by the applicant is used in a specific case. Since the meaning of the term will be clearly described in the corresponding part of the description in such a case, it is understood that the present disclosure will not be simply interpreted by the terms only used in the description of the present disclosure, but the meaning of the terms should be figured out.

Specific terminologies used in the description below may be provided to help the understanding of the present disclosure. Furthermore, the specific terminology may be modified into other forms within the scope of the technical concept of the present disclosure. For example, a signal, data, a sample, a picture, a frame, a block, etc may be properly replaced and interpreted in each coding process.

Hereinafter, in the present disclosure, a "processing unit" means a unit in which an encoding/decoding processing process, such as prediction, transform and/or quantization, is performed. Hereinafter, for convenience of description, a processing unit may also be called "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PU) or transform block (TB) for a chroma component. Also, the present disclosure is not limited to this, and the processing unit may be interpreted to include a unit for the luma component and a unit for the chroma component.

Furthermore, a processing unit is not essentially limited to a square block and may be constructed in a polygon form having three or more vertices.

FIG. 1 illustrates a schematic block diagram of an encoder in which the encoding of a still image or video signal is performed, as an embodiment to which the present disclosure is applied.

Referring to FIG. 1, the encoder 100 may include an image partitioning unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

Specifically, the inter prediction unit 181 according to the present disclosure may use inverse motion information in inter prediction (or inter-picture prediction) process. Detailed explanation will be described below.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present disclosure is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In the present disclosure, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Specifically, the inter prediction unit 261 according to the present disclosure may use inverse motion information in inter prediction (or inter-picture prediction) process. Detailed explanation will be described below.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present disclosure.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split cu flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present disclosure.

A PU is differently split depending on whether the intra-prediction mode is used or the inter-prediction mode is used as the coding mode of the CU to which the PU belongs.

FIG. 4(a) illustrates a PU if the intra-prediction mode is used, and

FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current processing unit on which decoding is performed, the decoded part of a current picture or other pictures including the current processing unit may be used.

A picture (slice) using only a current picture for reconstruction, that is, on which only intra-prediction is performed, may be called an intra-picture or I picture (slice), a picture (slice) using a maximum of one motion vector and reference index in order to predict each unit may be called a predictive picture or P picture (slice), and a picture (slice) using a maximum of two motion vector and reference indices may be called a bi-predictive picture or B a picture (slice).

Intra-prediction means a prediction method of deriving a current processing block from the data element (e.g., a sample value) of the same decoded picture (or slice). That is, intra-prediction means a method of predicting the pixel value of a current processing block with reference to reconstructed regions within a current picture.

Hereinafter, inter-prediction is described in more detail.

Inter-Prediction (or Inter-Frame Prediction)

Inter-prediction means a prediction method of deriving a current processing block based on the data element (e.g., sample value or motion vector) of a picture other than a current picture. That is, inter-prediction means a method of predicting the pixel value of a current processing block with reference to reconstructed regions within another reconstructed picture other than a current picture.

Inter-prediction (or inter-picture prediction) is a technology for removing redundancy present between pictures and is chiefly performed through motion estimation and motion compensation.

FIG. 5 is an embodiment to which the present disclosure may be applied and is a diagram illustrating the direction of inter-prediction.

Referring to FIG. 5, inter-prediction may be divided into uni-direction prediction in which only one past picture or future picture is used as a reference picture on a time axis with respect to a single block and bi-directional prediction in which both the past and future pictures are referred at the same time.

Furthermore, the uni-direction prediction may be divided into forward direction prediction in which a single reference picture temporally displayed (or output) prior to a current picture is used and backward direction prediction in which a single reference picture temporally displayed (or output) after a current picture is used.

In the inter-prediction process (i.e., uni-direction or bi-directional prediction), a motion parameter (or information) used to specify which reference region (or reference block) is used in predicting a current block includes an inter-prediction mode (in this case, the inter-prediction mode may indicate a reference direction (i.e., uni-direction or bidirectional) and a reference list (i.e., L0, L1 or bidirectional)), a reference index (or reference picture index or reference list index), and motion vector information. The motion vector information may include a motion vector, motion vector prediction (MVP) or a motion vector difference (MVD). The motion vector difference means a difference between a motion vector and a motion vector predictor.

In the uni-direction prediction, a motion parameter for one-side direction is used. That is, one motion parameter may be necessary to specify a reference region (or reference block).

In the bi-directional prediction, a motion parameter for both directions is used. In the bi-directional prediction method, a maximum of two reference regions may be used. The two reference regions may be present in the same reference picture or may be present in different pictures. That is, in the bi-directional prediction method, a maximum of two motion parameters may be used. Two motion vectors may have the same reference picture index or may have different reference picture indices. In this case, the reference pictures may be displayed temporally prior to a current picture or may be displayed (or output) temporally after a current picture.

The encoder performs motion estimation in which a reference region most similar to a current processing block is searched for in reference pictures in an inter-prediction process. Furthermore, the encoder may provide the decoder with a motion parameter for a reference region.

The encoder/decoder may obtain the reference region of a current processing block using a motion parameter. The reference region is present in a reference picture having a reference index. Furthermore, the pixel value or interpolated value of a reference region specified by a motion vector may be used as the predictor of a current processing block. That is, motion compensation in which an image of a current processing block is predicted from a previously decoded picture is performed using motion information.

In order to reduce the transfer rate related to motion vector information, a method of obtaining a motion vector predictor (mvd) using motion information of previously decoded blocks and transmitting only the corresponding difference (mvd) may be used. That is, the decoder calculates the motion vector predictor of a current processing block using motion information of other decoded blocks and obtains a motion vector value for the current processing block using a difference from the encoder. In obtaining the motion vector predictor, the decoder may obtain various motion vector candidate values using motion information of other already decoded blocks, and may obtain one of the various motion vector candidate values as a motion vector predictor.

Reference Picture Set and Reference Picture List

In order to manage multiple reference pictures, a set of previously decoded pictures are stored in the decoded picture buffer (DPB) for the decoding of the remaining pictures.

A reconstructed picture that belongs to reconstructed pictures stored in the DPB and that is used for inter-prediction is called a reference picture. In other words, a reference picture means a picture including a sample that may be used for inter-prediction in the decoding process of a next picture in a decoding sequence.

A reference picture set (RPS) means a set of reference pictures associated with a picture, and includes all of previously associated pictures in the decoding sequence. A reference picture set may be used for the inter-prediction of an associated picture or a picture following a picture in the decoding sequence. That is, reference pictures retained in the decoded picture buffer (DPB) may be called a reference picture set. The encoder may provide the decoder with a sequence parameter set (SPS) (i.e., a syntax structure having a syntax element) or reference picture set information in each slice header.

A reference picture list means a list of reference pictures used for the inter-prediction of a P picture (or slice) or a B picture (or slice). In this case, the reference picture list may be divided into two reference pictures lists, which may be called a reference picture list 0 (or L0) and a reference picture list 1 (or L1). Furthermore, a reference picture belonging to the reference picture list 0 may be called a reference picture 0 (or L0 reference picture), and a reference picture belonging to the reference picture list 1 may be called a reference picture 1 (or L1 reference picture).

In the decoding process of the P picture (or slice), one reference picture list (i.e., the reference picture list 0). In the decoding process of the B picture (or slice), two reference pictures lists (i.e., the reference picture list 0 and the reference picture list 1) may be used. Information for distinguishing between such reference picture lists for each reference picture may be provided to the decoder through reference picture set information. The decoder adds a reference picture to the reference picture list 0 or the reference picture list 1 based on reference picture set information.

In order to identify any one specific reference picture within a reference picture list, a reference picture index (or reference index) is used.

Fractional Sample Interpolation

A sample of a prediction block for an inter-predicted current processing block is obtained from the sample value of a corresponding reference region within a reference picture identified by a reference picture index. In this case, a corresponding reference region within a reference picture indicates the region of a location indicated by the horizontal component and vertical component of a motion vector. Fractional sample interpolation is used to generate a prediction sample for non-integer sample coordinates except a case where a motion vector has an integer value. For example, a motion vector of ¼ scale of the distance between samples may be supported.

In the case of HEVC, fractional sample interpolation of a luma component applies an 8 tab filter in the traverse direction and longitudinal direction. Furthermore, the fractional sample interpolation of a chroma component applies a 4 tab filter in the traverse direction and the longitudinal direction.

FIG. 6 is an embodiment to which the present disclosure may be applied and illustrates integers for ¼ sample interpolation and a fraction sample location.

Referring to FIG. 6, a shadow block in which an upper-case letter (A_i,j) is written indicates an integer sample location, and a block not having a shadow in which a lower-case letter (x_i,j) is written indicates a fraction sample location.

A fraction sample is generated by applying an interpolation filter to an integer sample value in the horizontal direction and the vertical direction. For example, in the case of the horizontal direction, the 8 tab filter may be applied to four integer sample values on the left side and four integer sample values on the right side based on a fraction sample to be generated.

Inter-Prediction Mode

In HEVC, in order to reduce the amount of motion information, a merge mode and advanced motion vector prediction (AMVP) may be used.

1) Merge Mode

The merge mode means a method of deriving a motion parameter (or information) from a spatially or temporally neighbor block.

In the merge mode, a set of available candidates includes spatially neighboring candidates, temporal candidates and generated candidates.

FIG. 7 is an embodiment to which the present disclosure may be applied and illustrates the location of a spatial candidate.

Referring to FIG. 7(a), whether each spatial candidate block is available depending on the sequence of {A1, B1, B0, A0, B2} is determined. In this case, if a candidate block is not encoded in the intra-prediction mode and motion information is present or if a candidate block is located out of a current picture (or slice), the corresponding candidate block cannot be used.

After the validity of a spatial candidate is determined, a spatial merge candidate may be configured by excluding an unnecessary candidate block from the candidate block of a current processing block. For example, if the candidate block of a current prediction block is a first prediction block within the same coding block, candidate blocks having the same motion information other than a corresponding candidate block may be excluded.

When the spatial merge candidate configuration is completed, a temporal merge candidate configuration process is performed in order of {T0, T1}.

In a temporal candidate configuration, if the right bottom block T0 of a collocated block of a reference picture is available, the corresponding block is configured as a temporal merge candidate. The collocated block means a block present in a location corresponding to a current processing block in a selected reference picture. In contrast, if not, a block T1 located at the center of the collocated block is configured as a temporal merge candidate.

A maximum number of merge candidates may be specified in a slice header. If the number of merge candidates is greater than the maximum number, a spatial candidate and temporal candidate having a smaller number than the maximum number are maintained. If not, the number of additional merge candidates (i.e., combined bi-predictive merging candidates) is generated by combining candidates added so far until the number of candidates becomes the maximum number.

The encoder configures a merge candidate list using the above method, and signals candidate block information, selected in a merge candidate list by performing motion estimation, to the decoder as a merge index (e.g., merge_idx [x0][y0]'). FIG. 7(b) illustrates a case where a B1 block has been selected from the merge candidate list. In this case, an "index 1 (Index 1)" may be signaled to the decoder as a merge index.

The decoder configures a merge candidate list like the encoder, and derives motion information about a current prediction block from motion information of a candidate block corresponding to a merge index from the encoder in the merge candidate list. Furthermore, the decoder generates a prediction block for a current processing block based on the derived motion information (i.e., motion compensation).

2) Advanced Motion Vector Prediction (AMVP) Mode

The AMVP mode means a method of deriving a motion vector prediction value from a neighbor block. Accordingly, a horizontal and vertical motion vector difference (MVD), a reference index and an inter-prediction mode are signaled to the decoder. Horizontal and vertical motion vector values are calculated using the derived motion vector prediction value and a motion vector difference (MVDP) provided by the encoder.

That is, the encoder configures a motion vector predictor candidate list, and signals a motion reference flag (i.e., candidate block information) (e.g., mvp_IX_flag[x0][y0]'), selected in motion vector predictor candidate list by performing motion estimation, to the decoder. The decoder configures a motion vector predictor candidate list like the encoder, and derives the motion vector predictor of a current processing block using motion information of a candidate block indicated by a motion reference flag received from the encoder in the motion vector predictor candidate list. Furthermore, the decoder obtains a motion vector value for the current processing block using the derived motion vector predictor and a motion vector difference transmitted by the encoder. Furthermore, the decoder generates a prediction block for the current processing block based on the derived motion information (i.e., motion compensation).

In the case of the AMVP mode, two spatial motion candidates of the five available candidates in FIG. 7 are selected. The first spatial motion candidate is selected from a {A0, A1} set located on the left side, and the second spatial motion candidate is selected from a {B0, B1, B2} set located at the top. In this case, if the reference index of a neighbor candidate block is not the same as a current prediction block, a motion vector is scaled.

If the number of candidates selected as a result of search for spatial motion candidates is 2, a candidate configuration is terminated. If the number of selected candidates is less than 2, a temporal motion candidate is added.

FIG. 8 is an embodiment to which the present disclosure is applied and is a diagram illustrating an inter-prediction method.

Referring to FIG. 8, the decoder (in particular, the inter-prediction unit 261 of the decoder in FIG. 2) decodes a motion parameter for a processing block (e.g., a prediction unit) (S801).

For example, if the merge mode has been applied to the processing block, the decoder may decode a merge index signaled by the encoder.

Furthermore, the motion parameter of the current processing block may be derived from the motion parameter of a candidate block indicated by the merge index. Furthermore, if the AMVP mode has been applied to the processing block, the decoder may decode a horizontal and vertical motion vector difference (MVD), a reference index and an inter-prediction mode signaled by the encoder. Furthermore, the decoder may derive a motion vector predictor from the motion parameter of a candidate block indicated by a motion reference flag, and may derive the motion vector value of a current processing block using the motion vector predictor and the received motion vector difference.

The decoder performs motion compensation on a prediction unit using the decoded motion parameter (or information) (S802).

That is, the encoder/decoder perform motion compensation in which an image of a current unit is predicted from a previously decoded picture using the decoded motion parameter.

FIG. 9 is an embodiment to which the present disclosure may be applied and is a diagram illustrating a motion compensation process.

FIG. 9 illustrates a case where a motion parameter for a current block to be encoded in a current picture is uni-direction prediction, a second picture within LIST0, LIST0, and a motion vector (−a, b).

In this case, as in FIG. 9, the current block is predicted using the values (i.e., the sample values of a reference block) of a location (−a, b) spaced apart from the current block in the second picture of LIST0.

In the case of bi-directional prediction, another reference list (e.g., LIST1), a reference index and a motion vector difference are transmitted. The decoder derives two reference blocks and predicts a current block value based on the two reference blocks.

Inter Prediction Mode Based Image Processing Method

In the inter prediction, a merge mode using motion information of a spatially or temporally adjacent block is used in order to effectively reduce the amount of motion information.

The merge mode derives motion information (a prediction direction, a reference picture index, and a motion vector prediction value) only by a merge flag and a merge index, but arranges (or determine) candidates according to a predetermined order or number, and as a result, even though accuracy of a motion of a specific candidate block is high, a bit amount allocated to the merge index may not be selected. In other words, a lot of bits may be allocated according to an order in a merge list in spite of motion accuracy of a merge candidate, and as a result, compression efficiency may be reduced.

Accordingly, the present disclosure proposes a method for recording a merge candidate list in order to solve such a problem and effectively configure the merge candidates.

According to an embodiment of the present disclosure, the accuracy of prediction may be increased by generating the merge candidate list in consideration of more candidates compared to the existing merge mode, and the motion information may be signaled with a small bit amount by using the reorder merge candidate list, thereby increasing the compression efficiency.

Embodiment 1

In an embodiment of the present disclosure, an encoder/decoder may configure the merge candidate list by using the motion information of the spatially or temporally adjacent (or neighboring) block and reorder the merge candidate list based on a correlation (or similarity) between template regions. First, a method for configuring the merge candidate list will be described with reference to a diagram described below.

FIG. 10 is a diagram for describing a method for generating a merge candidate list by using a spatial neighbor block or a temporal neighbor block as an embodiment to which the present disclosure is applied.

Referring to FIG. 10, the encoder/decoder may configure the merge candidate list in a predetermined order until the maximum number is satisfied by using the motion information of the spatially or temporally adjacent block or motion information combining the motion information. For example, the encoder/decoder may configure the merge candidate list by searching (or checking) the merge candidate in the following order.

[A1(1001), B1(1002), B0(1003), A0(1004), ATMVP (Advanced Temporal Motion Vector Predictor), ATMVP-Ext (ATMVP-ext: Advanced Temporal Motion Vector Predictor-extension), B2(1005), TMVP (i.e., T0(1006) or T1(1007)), combination candidate, zero motion vector]

The encoder/decoder searches the candidates in such an order and adds candidates of a predetermined number to configure the merge candidate list. In addition, the encoder/decoder may allocate the merge index in order with respect to each candidate in the merge candidate list and encode/decode the allocated merge index.

As described above, since the candidates are listed according to a predetermined number or order, even when motion accuracy of a specific candidate block is high, a problem that the candidate may not be selected by considering the bit amount allocated to the merge index may occur.

In order to improve such a problem, the embodiment proposes a method for reordering the merge candidate list based cost of each candidate of the merge candidate list. Hereinafter, it is consistently expressed that the merge candidate list is reordered, but the present disclosure is not limited only to such an expression and it may be expressed that the merge candidate list is rearranged, redisposed, ordered, and arranged or it may be expressed that the order of the candidates in the merge candidate list is changed, adjusted, and modified.

FIG. 11 is a flowchart showing a method for reordering a merge candidate list based on cost as an embodiment to which the present disclosure is applied.

Referring to FIG. 11, the encoder/decoder configures the merge candidate list by using the motion information of the spatial neighbor block or temporal neighbor block (S1101). For example, the encoder/decoder may configure the merge candidate list by applying the method described in FIG. 10 above.

The encoder/decoder calculates cost for each candidate of the merge candidate list generated in step S1101 (S1102). Here, the cost is a variable representing the similarity (or correlation) between a template of a current block and the template of a reference block. For example, the cost may be calculated as a difference value between the templates of the current block and the reference block. As the cost is smaller, the similarity between the templates is higher. The method for calculating the cost by using the template will be described in detail in Embodiment 3 to be described below.

The encoder/decoder reorders candidates of the merge candidate list based on the cost calculated in step S1102 (S1103). In addition, the encoder/decoder finally updates the reorder merge candidate list (S1104). In this case, the encoder/decoder may reorder the merge candidate list in order from a candidate having small cost. A step of reordering the merge candidate list may include steps S1103 and S1104.

FIG. 12 is a diagram illustrating a method for reordering a merge candidate list based on cost as an embodiment to which the present disclosure is applied.

Referring to FIG. 12, it is assumed that the maximum number of merge candidate lists is 7. The encoder/decoder may configure the merge candidate list as illustrated in FIG. 12. In this case, the method described in FIG. 10 above may be applied.

The encoder/decoder may calculate the cost of the candidate in the merge candidate list and then reorder the candidates based on the calculated cost. In addition, the encoder/decoder updates the order of the merge candidates in the reorder order to generate the merge candidate list. Hereinafter, in the present disclosure, the merge candidate list configured before reordering based on the cost may be referred to as a temporary candidate list (or temporary merge candidate list). In addition, the merge candidate list updated through reordering may be referred to as a final candidate list (or final merge candidate list).

According to the embodiment of the present disclosure, since the merge candidate list may be reordered by reflecting features of an image, a small merge index may be allocated to a candidate having a relatively high selection probability. Therefore, signaling bits for expressing the motion information may be saved and the compression performance may be increased.

In an embodiment, when there is duplicated motion information in the reordered merge candidate list (i.e., final merge candidate list), the encoder/decoder may delete the corresponding candidate from the list. The candidate having the duplicated motion information is deleted, and as a result, smaller bits may be allocated to subsequent candidates. Further, when the maximum number of candidates in the merge candidate list is not satisfied due to the aforementioned duplicated check, the encoder/decoder may add another candidate as the merge candidate.

Embodiment 2

In the embodiment of the present disclosure, the encoder/decoder may configure the merge candidate list by using various merge candidates. The merge candidate list is configured by additionally using various merge candidates in addition to the existing merge candidate to effectively reduce the amount of merge mode motion information.

In an embodiment, the encoder/decoder may consider as the candidate a uni-direction motion vector of the motion information of the candidate block having a bi-direction motion vector among the merge candidate blocks. In other words, the encoder/decoder may add as the candidate the uni-direction motion vector of the candidate having the bi-direction motion vector among the merge candidate blocks.

For example, in FIG. 10 above, when block A1 1001 has the bi-direction motion vector, the encoder/decoder may select a motion vector (or mode) having the smallest cost by comparing cost calculated by using the bi-direction motion vector and cost calculated by using a motion vector in an L0 and/or L1 direction and add the selected motion vector to the merge candidate list. The encoder/decoder may apply the same method to each candidate in the merge candidate list. The encoder/decoder may apply the method proposed in the embodiment to all candidates in the merge candidate list or apply the method only to some modes. After all merge candidates are added to the merge candidate list, the encoder/decoder may reorder the merge candidate list based on the cost.

When the encoder/decoder adds the candidate to the merge candidate list, the encoder/decoder may apply the proposed method or add each of bi-directions, L0 direction, and L1 direction as the candidate as follows.

[A1, B1, B0, A0, ATMVP, ATMVP-Ext, A1-L0, A1-L1, B1-L0, B1-L1, B2, TMVP, combination motion vector, zero motion vector]

Here, it is assumed that blocks A1 and B1 have bi-direction motion information. A1-L0 and B1-L0 represent uni-direction motion information of the L0 direction and A1-L1 and B1-L1 represent uni-direction motion information of the L1 direction. In this case, a location or order of the added candidate is changeable. Further, in addition to the merge candidate order described hereinabove, the method may be applied when the maximum number of merge candidates is not filled due to the duplicated check after reordering of the merge candidate list.

A method for applying the method proposed when adding the candidate to the merge candidate list will be described with reference to drawings described below.

FIGS. 13 and 14 are flowcharts showing a method for configuring a merge candidate as an embodiment to which the present disclosure is applied.

Referring to FIG. 13, the encoder/decoder checks the merge candidate in order to add the merge candidate to the merge candidate list (S1301). The encoder/decoder determines whether a current candidate block has the bi-direction motion information (S1302).

If the current candidate block has the bi-direction motion information as a bi-direction predicted block, the encoder/decoder calculates the cost for each of bi-direction, L0, and L1 direction motion vectors (S1303). The method for calculating the cost will be described in detail in Embodiment 3 to be described below.

The encoder/decoder selects a motion vector in a direction having the smallest cost based on the cost calculated in step S1304 and configures the merge candidate list by using the selected motion vector (S1305). In other words, the encoder/decoder adds a motion vector in a direction having best cost to the merge candidate list.

If the current candidate block does not have the bi-direction motion information, the encoder/decoder adds the corresponding uni-direction motion information to the merge candidate list.

As illustrated in FIG. 14, the encoder/decoder may add motion information in the direction having the best cost to the merge candidate list through cost comparison with the uni-direction motion information for each candidate block having the bi-direction motion information.

Further, in an embodiment, the encoder/decoder may generate the merge candidate by using motion information of blocks neighboring to a left or upper side of the current block.

FIG. 15 is a diagram illustrating a method for generating a merge candidate by using neighbor blocks as an embodiment to which the present disclosure is applied.

The motion information may be stored in units of sub-block for a sub-block unit process and in the embodiment, it is assumed that the sub-block is a 4×4 block. In addition, it is assumed that a current processing block is a 16×16 block.

According to the method described in FIG. 10 above, blocks at locations A1 and location B1 are used as a left block and an upper block of the current block. However, since each sub block may have a different motion vector, neighbor blocks of the current block may have various motion vectors. Accordingly, additional motion information is considered as the merge candidate in addition to the existing motion information of the blocks at locations A1 and B1 to enhance the accuracy of the prediction.

Referring to FIG. 15(a), the encoder/decoder may generate the merge candidate by averaging each of the motion vectors of the left or upper neighboring sub-blocks of the current block. Referring to FIG. 15(b), the encoder/decoder may generate as the merge candidate a median value of the motion vectors of the left or upper neighboring sub-blocks of the current block.

The left sub-blocks adjacent to the current block may extend upwards or downwards and the adjacent upper sub-blocks may extend leftwards or rightwards. That is, the encoder/decoder may use four sub-blocks as illustrated in FIG. 15(a), use five sub-blocks as illustrated in FIG. 15(b), or use six or more left or upper sub-blocks in order to calculate the average value or the median value of the left or upper sub-blocks.

In addition, there may be a sub-block having a peaked motion vector having a large difference from the motion vector of the neighboring sub-block among the sub-blocks neighboring to the left side or upper side. In calculating the average value or the media value of the motion vectors of the left or upper sub-blocks, the encoder/decoder may set a threshold in order to exclude the peaked motion vector. In addition, the encoder/decoder may calculate the average value or median value except for a motion vector of a sub-block in which the magnitude or vertical/horizontal component of the motion vector is greater than a threshold among the motion vectors of the neighboring sub-blocks.

The encoder/decoder may add the merge candidate generated by such a method to a predetermined location of the merge candidate list. For example, when the average values of the motion information of the sub-blocks neighboring to the left side and the upper side are referred to as a left average value L-Avg and an upper average value A-Avg, respectively, the encoder/decoder may add the left average value and the upper average value as the merge candidate in the following order.

[A1, B1, B0, A0, ATMVP, ATMVP-Ext, L-Avg, A-Avg, B2, TMVP, combination candidate, zero motion vector]

Here, the order between candidates (or candidate search order) is not limited thereto and may be changed. Further, in addition to the merge candidate order described hereinabove, the method may be applied when the maximum number of merge candidates is not filled due to the duplicated check after reordering of the merge candidate list.

In an embodiment, the encoder/decoder may calculate the average value by using motion information of a sub-block having the same index as a sub-block at a specific location between the current block or the neighboring sub-block among the motion information of the neighboring sub-blocks or determine a mode among the reference picture indexes of the neighboring sub-blocks as the reference picture index and calculate the average or median value of the neighboring motion information by using all motion vectors of the neighboring sub-blocks. Alternatively, the encoder/decoder may calculate the average value or median value of the neighboring motion information by using a motion vector scaled based on a distance from a reference picture.

Further, in an embodiment, the encoder/decoder may refine the motion vector of the merge candidate. The motion vector of the merge candidate is refined in units of integer pixels or fractional pixels to increase the accuracy of motion information prediction.

For example, the encoder/decoder may refine the motion vector of the merge candidate and then add the refined merge candidate to the merge candidate list in configuring the merge candidate list. Alternatively, the encoder/decoder may generate the merge candidate list and then refine the motion vector of each candidate in the merge candidate list. Hereinafter, the method will be described with reference to following drawings.

FIG. 16 is a diagram for describing a method for refining a motion vector of a merge candidate as an embodiment to which the present disclosure is applied.

Referring to FIG. 16 the encoder/decoder may calculate cost indicating the similarity between the template region of the current block and the template region of an identified reference block by using the motion vector of the current merge candidate. In addition, the encoder/decoder may calculate cost of the temperature region of the current block and the template region of the reference block identified by the refined motion vector.

In this case, the encoder/decoder may calculate cost at eight adjacent pixel locations based on the motion vector of the current merge candidate (STEP 1). Thereafter, the encoder/decoder may calculate cost at three adjacent pixel locations based on a location having minimum cost (STEP 2). Thereafter, the encoder/decoder calculates cost at four adjacent pixel locations to finally select a location having the smallest cost (STEP 3).

The encoder/decoder may use an adjacent pixel of an integer pixel location or an adjacent pixel of a fractional pixel location in calculating the cost at the adjacent pixel location in STEPS 1 to 3. For example, the encoder/decoder may calculate/compare cost at integer pixel neighboring locations in STEPS 1 and 2 and calculate/compare cost at opposite pixel neighboring location in STEP 3.

In the method for refining the motion vector of the merge candidate described above as one example, some steps may be added or deleted or the locations or number of neighboring pixels may also be changed.

FIG. 17 is a flowchart showing a method for refining a motion vector of a merge candidate as an embodiment to which the present disclosure is applied.

Referring to FIG. 17, the encoder/decoder checks the merge candidate in order to refine the motion vector of the merge candidate (S1701). Refinement of the motion vector for the merge candidate may be performed while adding the merge candidate to the merge candidate list or performed after configuring the merge candidate list.

The encoder/decoder may check the merge candidate in order to refine the motion vector of the merge candidate according to a candidate configuring order taken as an example in FIGS. 10, 13, and 15 above. In this case, the encoder/decoder may check all candidates or only some predetermined candidates. For example, the encoder/decoder may not apply to a mode in which the motion information is used in units of sub-blocks such as ATMVP and ATMVP-Ext.

The encoder/decoder performs motion vector refinement based on the motion vector of the merge candidate (S1702). The method described in FIG. 16 above may be applied in step S1702 above. That is, the encoder/decoder performs refinement of the motion vector while calculating the cost of the neighboring integer pixel location or fractional pixel location and selecting the location having the best cost.

The encoder/decoder finally selects a candidate having the best cost and adds the selected candidate to the merge candidate list (S1703 and S1704).

As described above, refinement of the motion vector for the merge candidate may be performed while adding the merge candidate to the merge candidate list or performed after configuring the merge candidate list. In addition, the refined merge candidate may replace the existing candidate or may be added as a new candidate. For example, the encoder/decoder may configure the merge candidates in the following order.

[A1, B1, B0, A0, ATMVP, ATMVP-Ext, A1-refinement, B1-refinement, B2, TMVP, combination candidate, zero motion vector]

Here, A1-refinement represents a candidate (or motion information) in which the motion vector of candidate A1 is refined and B1-refinement represents a candidate in which the motion vector of candidate B1 is refined. In this case, the order (or candidate search order) between the candidates is not limited thereto and may be changed and an added candidate may be a candidate in which the motion vector of another candidate other than candidate A1 and/or candidate B1 is refined.

Besides, the method may be applied when the maximum number of merge candidates is not filled due to the duplicated check after reordering of the merge candidate list.

FIG. 18 is a flowchart showing a method for refining a motion vector of a merge candidate as an embodiment to which the present disclosure is applied.

Referring to FIG. 18, the encoder/decoder may refine or replace the merge candidate according to a specific condition.

Referring to FIG. 18, the encoder/decoder checks the merge candidate in order to refine the motion vector of the merge candidate (S18701). Refinement of the motion vector for the merge candidate may be performed while adding the merge candidate to the merge candidate list or performed after configuring the merge candidate list.

The encoder/decoder determines whether a current candidate is in the ATMVP or ATMVP-Ext mode (S1802). That is, the encoder/decoder determines whether the current candidate is a candidate to which a sub-block-unit motion prediction process is applied.

When the current candidate is in the ATMVP and ATMVP-Ext modes according to a result of determination in step S1802, the encoder/decoder performs the motion vector refinement based on the motion vector of the merge candidate (S1803). The method described in FIG. 16 above may be applied in step S1803 above. That is, the encoder/decoder performs refinement of the motion vector while calculating the cost of the neighboring integer pixel location or fractional pixel location and selecting the location having the best cost.

The encoder/decoder finally selects the candidate having the best cost (S1804). In addition, the encoder/decoder determines whether candidate selected in step S1804, i.e., the refined candidate is the same as a candidate which is not refined (S1805).

When the current candidate is the same as the selected candidate as a result of determination in step S1805, the encoder/decoder checks another candidate in order to refine the motion vector of the merge candidate.

When the current candidate is not the same as the selected candidate as the result of determination in step S1805), the encoder/decoder replaces the selected candidate with a last candidate of the merge candidate list (S1806) and finally configures the merge candidate list (S1807).

In the existing merge mode, the merge candidates are checked in a predetermined order until the maximum number (e.g., eight) of the merge candidate list is filled to configure the merge candidate list and the merge index is allocated in the order of the merge candidate list. Encoding efficiency may be increased by configuring the merge candidates by using various motion information, while there is a limit in increasing the number of candidates due to an increase in signaling bits.

In an embodiment of the present disclosure, the encoder/decoder may generate the merge candidate list by using more candidates than the existing method.

For example, when it is assumed that the number of candidates to which the merge index is allocated is 7, the encoder may generate a temporary merge candidate list by using 10 merge candidates. In addition, the encoder may reorder the temporary merge candidate list based on the cost and generate top 7 candidates among the reordered candidates.

According to the existing method, when it is assumed that the maximum number of merge candidate lists is 7, if 7 candidates are filled by checking the candidates in order, a subsequent candidate is not considered. However, according to the method proposed in the embodiment, since more candidates than the existing method may be considered, the accuracy of the prediction may be enhanced.

In this case, the encoder/decoder may generate the temporary merge candidate list by using all candidates in configuring the temporary merge candidate list configure the temporary merge candidate list by using a specific number of candidates by considering complexity or a buffer size. The maximum number (or the number of candidates to which the merge index is allocated) of final merge candidate lists may be determined to be different from the maximum number of temporary merge candidate lists. The maximum number of final merge candidate lists or temporary candidate lists may be predetermined in the encoder or decoder or signaled from the encoder to the decoder. In the latter case, the maximum number may be signaled from the encoder to the decoder in units of sequence, picture, slice, CTU, or CU. The encoder/decoder duplicatively checks the merge candidate by checking the candidates previously added for each step to add various candidates to the list in configuring the merge candidate list.

Embodiment 3

In an embodiment of the present disclosure, the encoder/decoder may calculate the cost of the merge candidate by using the template regions of the current block and the reference block. That is, the cost of the merge candidates is calculated based on the similarity between the adjacent regions of the current block and the reference block to enhance the prediction of motion prediction. The encoder/decoder may reorder the merge candidates based on the cost without signaling overhead.

FIG. 19 is a diagram for describing a method for calculating cost based on a template as an embodiment to which the present disclosure is applied.

Referring to FIG. 19, the encoder/decoder may calculate the cost by using a left or upper template region of a current block 1901 and a left or upper template region of a reference block 1902. The reference block 1902 may be specified by motion information of a current candidate calculating the cost.

In FIG. 19, costL0_L represents left cost and costL0_A represents upper cost. Final cost of the current candidate may be calculated by using Equation 1 below.

$$costBi=(costL0\_A+costL0\_L+costL1\_A+costL1\_L)>>1$$

$$costLX=costLX\_A+costLX\_L \quad \text{[Equation 1]}$$

Referring to Equation 1, the encoder/decoder may calculate the cost by using a sum of costL0_L and costL0_A. If the current has the bi-direction motion information (i.e., in the case of a bidirectionally predicted block), the cost may be calculated by averaging costL0 and costL1. costLX_A (X=0, 1) may be calculated by a difference value between the upper templates of the current block and the reference block. costLX_L(X=0, 1) may be calculated by a difference value between the left templates of the current block and the reference block. In this case, the difference value between the template regions may be calculated by using various known methods. For example, SSE, SAD, etc., may be used.

Since the motion information of the block adjacent to the current block is used in the merge mode, when the cost is calculated based on the template, left and upper cost may be significantly different according to the location of the adjacent block.

FIG. 20 is a diagram for describing a method for calculating cost based on a template as an embodiment to which the present disclosure is applied.

Referring to FIG. 20(a), when the current candidate is a left block, distortion between reconstructed regions of a left template region may be relatively small and the cost of the left template may be calculated to be small. When the motion information of the upper block is used, i.e., when the current candidate is the upper block, the cost of the upper template may be calculated to be small.

Referring to FIG. 20(b), the difference in cost between the left and upper templates may be noticeable when the current block is a non-square block. That is, when the current block is a non-square block in which a length is longer than a width, if the motion vector of an adjacent left block is used, the cost of the left template may be calculated to be small and the cost of the upper template may be calculated to be large. However, when the current block is the non-square block as such, since the sizes of the left template region and the upper template regions are different from each other, an influence of the upper template may not be small in finally deriving the cost.

Meanwhile, when the motion vector of the adjacent upper block is used, even though the cost of the upper template may be calculated to be small, the size of the upper template region is small, and as a result, the influence of the upper template may be small similarly in finally deriving the cost. Accordingly, when the current block is a non-square block in which the length is long, there may be a problem in that the cost when the left motion information is used may be calculated to be relatively smaller than the cost when the upper motion information is used.

In addition, in FIG. 20(c), when the current block is the non-square block in which the width is long in contrast to FIG. 20(b), the cost when the upper motion information is used may be calculated to be relatively smaller than the cost when the left motion information is used.

In the embodiment of the present disclosure, the cost of the template is normalized to improve a problem caused due to a difference in size of the template region. When it is assumed that the size of the current block is width×height and the sizes of the left and top templates are (4×height) and (width×4), respectively, the encoder/decoder may acquire normalized cost costL' (left) and costA' (top) by using Equation 2 below.

$$costL'=costL>>\log 2(4\times height)$$

$$costA'=costA>>\log 2(width\times 4) \quad \text{[Equation 2]}$$

The encoder/decoder may apply the method for calculating the cost based on the template to all merge candidates. In particular, in the case of the ATMVP and ATMVP-Ext modes processed in units of sub-block a method proposed based on a default motion vector may be applied. Meanwhile, when the cost is calculated based on the default motion vector, reliability of the cost may be lowered. In this case, the encoder/decoder may modify or change the default motion vector in such a case.

Hereinabove, the method for configuring the candidate list in the merge mode has been primarily described, but the above-mentioned embodiment may be similarly applied even in an Advanced Motion Vector Pred (AMVP) mode. That is, when the merge mode is not applied, the AMVP mode is applied and in this case, the decoder may generate an AMVP candidate list by applying the method described above and perform inter prediction by using a motion vector difference value and a reference picture index received from the encoder.

Further, the above-mentioned embodiments may be independently applied and one or more embodiments may be combined and applied.

FIG. 21 is a diagram illustrating an inter prediction method according to an embodiment of the present disclosure.

Referring to FIG. 21, the decoder is primarily described for convenience of description, but the inter prediction method according to the embodiment may be similarly applied to the encoder and the decoder.

The decoder generates the temporary candidate list by using the motion information of a spatial neighbor block or temporal neighbor block (S2101). For example, the decoder may generate the temporary candidate list by using the motion information of the neighbor block according to the candidate configuring order taken as the example in FIGS. 10, 13, and 15 above.

Further, for example, the spatial neighbor block may be one of a block adjacent to a lower left boundary of the current block, a block adjacent to an upper left boundary, a block adjacent to an upper right boundary, a block adjacent to an upper boundary, or a block adjacent to a left boundary. Here, the block adjacent to the upper boundary may be a block including a pixel adjacent to the upper left boundary of the current block and a pixel adjacent in a vertical direction or a block including an upper right pixel of the current block and the pixel adjacent in the vertical direction. The block adjacent to the left boundary may be a block including the lower left pixel of the current block and a pixel adjacent in a horizontal direction.

Further, as described in FIGS. 13 and 14 above, the encoder/decoder may add as the candidate a uni-direction motion vector of the motion information of the candidate block having a bi-direction motion vector among the merge candidate blocks. In this case, step S2101 above may include a step of checking the candidate having the bi-direction motion information among the candidates of the temporary candidate list and a step of adding to the temporary candidate list uni-direction motion information of the L0 direction or L1 direction among the motion information of the candidate having the bi-direction motion information.

Further, as described in FIG. 15 above, the decoder may add the merge candidate by using motion information of blocks neighboring to a left or upper side of the current block. In this case, step S2101 may include a step of adding to the temporary candidate list an average value or median value of motion information of blocks having a predetermined size, which is neighboring to the left side or upper side of the current block. In addition, the decoder may scale motion vectors of blocks having a predetermined size according to the distance from the reference picture.

The decoder calculates the cost for each candidate in the temporary candidate list by using the template of the current block (S2102).

As described in FIGS. 19 and 20 above, the cost for each candidate may be calculated based on a difference value between the template of the current block and the template of the reference block identified by the motion vector of the candidate. The difference value may be normalized based on the width and the height of the current block.

The decoder reorders the candidates of the temporary candidate list based on the calculated cost to generate the final candidate list (S2103).

Further, as described in FIGS. 16 to 18 above, the decoder may refine the motion vector of the merge candidate. The decoder may refine the motion vectors of the candidates in the final candidate list in units of integer pixels or fractional pixels. In addition, the decoder may calculate the cost of the motion vector indicating the integer pixel or fractional pixel adjacent to the pixel identified by the motion vector and determine the refined motion vector by using the motion vector having the best cost. In this case, the decoder may calculate the cost of the motion vector by applying the method described in Embodiment 3 above.

The decoder decodes the merge index indicating a specific candidate in the final candidate list (S2104).

As described above, the maximum number of temporary merge candidate lists is set to be larger than the maximum number of final merge candidate lists to configure the merge candidate list by considering more candidates than the existing method. That is, the merge index may indicate any one of a predetermined number of candidates in a higher order in the final candidate list.

The decoder generates the prediction block of the current block by using the motion information of the candidate indicated by the merge index (S2105).

FIG. 22 is a diagram more specifically illustrating an intra predictor according to an embodiment of the present disclosure.

In FIG. 22, the intra prediction unit is illustrated as one block for convenience of description, but the intra prediction unit may be implemented in a component included in the encoder and/or the decoder.

Referring to FIG. 22, the inter prediction unit implements the functions, procedures, and/or methods proposed in FIGS. 5 to 21 above. Specifically, the inter prediction unit may be configured to include a temporary candidate list generation unit 2201, a cost calculation unit 2202, a final candidate list generation unit 2203, a merge index decoding unit 2204, and a prediction block generation unit 2205.

The temporary candidate list generation unit 2201 generates the temporary candidate list by using the motion information of a spatial neighbor block or temporal neighbor block. For example, the temporary candidate list generation unit 2201 may generate the temporary candidate list by using the motion information of the neighbor block according to the candidate configuring order taken as the example in FIGS. 10, 13, and 15 above.

Further, for example, the spatial neighbor block may be one of a block adjacent to a lower left boundary of the current block, a block adjacent to an upper left boundary, a block adjacent to an upper right boundary, a block adjacent to an upper boundary, or a block adjacent to a left boundary. Here, the block adjacent to the upper boundary may be a block including a pixel adjacent to the upper left boundary of the current block and a pixel adjacent in a vertical direction or a block including an upper right pixel of the current block and the pixel adjacent in the vertical direction. The block adjacent to the left boundary may be a block including the lower left pixel of the current block and a pixel adjacent in a horizontal direction.

Further, as described in FIGS. 13 and 14 above, the temporary candidate list generation unit 2201 may add as the candidate a uni-direction motion vector of the motion information of the candidate block having a bi-direction motion vector among the merge candidate blocks. In this case, the temporary candidate list generation unit 2201 may check the candidate having the bi-direction motion information among the candidates of the temporary candidate list and add to the temporary candidate list uni-direction motion information of the L0 direction or L1 direction among the motion information of the candidate having the bi-direction motion information.

Further, as described in FIG. 15 above, the temporary candidate list generation unit 2201 may add the merge candidate by using motion information of blocks neighboring to a left or upper side of the current block. In this case, the temporary candidate list generation unit 2201 may add to the temporary candidate list an average value or median value of motion information of blocks having a predetermined size, which is neighboring to the left side or upper side of the current block. In addition, the temporary candidate list generation unit 2201 may scale motion vectors of blocks having a predetermined size according to the distance from the reference picture.

The cost calculation unit 2202 calculates the cost for each candidate in the temporary candidate list by using the template of the current block.

As described in FIGS. 19 and 20 above, the cost for each candidate may be calculated based on a difference value between the template of the current block and the template of the reference block identified by the motion vector of the candidate. The difference value may be normalized based on the width and the height of the current block.

The final candidate list generation unit 2203 reorders the candidates of the temporary candidate list based on the calculated cost to generate the final candidate list.

Further, as described in FIGS. 16 to 18 above, the decoder may refine the motion vector of the merge candidate. The decoder may refine the motion vectors of the candidates in the final candidate list in units of integer pixels or fractional pixels. In addition, the decoder may calculate the cost of the motion vector indicating the integer pixel or fractional pixel adjacent to the pixel identified by the motion vector and determine the refined motion vector by using the motion vector having the best cost. In this case, the decoder may calculate the cost of the motion vector by applying the method described in Embodiment 3 above.

The merge index decoding unit 2204 decodes the merge index indicating a specific candidate in the final candidate list.

As described above, the maximum number of temporary merge candidate lists is set to be larger than the maximum number of final merge candidate lists to configure the merge candidate list by considering more candidates than the existing method. That is, the merge index may indicate any one of a predetermined number of candidates in a higher order in the final candidate list.

The prediction block generation unit 2205 generates the prediction block of the current block by using the motion information of the candidate indicated by the merge index.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The aforementioned preferred embodiments of the present disclosure have been disclosed for illustrative purposes, and those skilled in the art may improve, change, substitute, or add various other embodiments without departing from the technological spirit and scope of the present disclosure disclosed in the attached claims.

The invention claimed is:

1. A method for processing an image based on an inter prediction mode, comprising:
   generating, by a processor, a temporary candidate list by using a spatial neighbor block or temporal neighbor block of a current block;
   calculating, by the processor, a cost for each candidate in the temporary candidate list based on a difference between a template of the current block and a template of a reference block of a motion vector of the candidate;
   generating, by the processor, a final candidate list by rearranging candidates of the temporary candidate list based on the calculated cost;
   decoding, by the processor, a merge index indicating a specific candidate in the final candidate list; and
   generating, by the processor, a prediction block of the current block by using motion information of a candidate indicated by the merge index,
   wherein the calculating of the cost includes: performing a normalization on the difference based on a width and a height of the current block when the current block is a non-square block.

2. The method of claim 1,
wherein the merge index indicates one of predetermined number of candidates according to a high order of the final candidate list.

3. The method of claim 1,
wherein generating the temporary candidate list comprises:
identifying a candidate having a bi-direction motion information among candidates of the temporary candidate list; and
adding uni-direction motion information of L0 direction or L1 direction to the temporary candidate list, among motion information having the bi-direction motion information.

4. The method of claim 1,
wherein generating the temporary candidate list comprises:
adding an average value or a median value of motion information of blocks having a predetermined size neighboring to a left side or an upper side of the current block to the temporary candidate list.

5. The method of claim 4,
wherein adding the average value or the median value to the temporary candidate list comprises:
scaling a motion vector of the blocks having the predetermined size according to a distance to a reference picture.

6. The method of claim 1, further comprising:
refining, by the processor, a motion vector of candidates in the final candidate list in an integer pixel unit or a fractional pixel unit.

7. The method of claim 6,
wherein refining the motion vector comprises:
calculating a cost of a motion vector indicating a neighboring integer pixel or a neighboring fractional pixel which is adjacent to a pixel indicated by the motion vector.

8. The method of claim 7,
wherein the cost of the motion vector indicating the neighboring integer pixel or the neighboring fractional pixel is calculated based on a difference between the template of the current block and a template of a reference block identified by the motion vector indicating the neighboring integer pixel or the neighboring fractional pixel.

9. An apparatus for processing an image based on an inter prediction mode, comprising:
a memory configured to store data of the image; and
a processor coupled to the memory,
wherein the processor is configured for:
generating a temporary candidate list by using a spatial neighbor block or temporal neighbor block of a current block;
calculating a cost for each candidate in the temporary candidate list based on a difference between a template of the current block and a template of a reference block of a motion vector of the candidate;
generating a final candidate list by rearranging candidates of the temporary candidate list based on the calculated cost;
decoding a merge index indicating a specific candidate in the final candidate list; and
generating a prediction block of the current block by using motion information of a candidate indicated by the merge index,
wherein the processor is further configured for performing a normalization on the difference based on a width and a height of the current block when the current block is a non-square block.

* * * * *